United States Patent
Montoya et al.

(10) Patent No.: US 10,208,620 B2
(45) Date of Patent: Feb. 19, 2019

(54) OVERSPEED PROTECTION DEVICE OF AN AIRCRAFT ENGINE

(71) Applicants: Safran Electronics & Defense, Boulogne-Billancourt (FR); Safran Helicopter Engines, Bordes (FR)

(72) Inventors: Michael Montoya, Boulogne-Billancourt (FR); Nicolas Marti, Boulogne-Billancourt (FR); Stephen Langford, Pau (FR); Rafael Samson, Lit et Mixe (FR)

(73) Assignees: SAFRAN ELECTRONICS & DEFENSE, Boulogne-Billancourt (FR); SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 15/327,630

(22) PCT Filed: Jul. 21, 2015

(86) PCT No.: PCT/FR2015/052006
§ 371 (c)(1),
(2) Date: Jan. 19, 2017

(87) PCT Pub. No.: WO2016/012713
PCT Pub. Date: Jan. 28, 2016

(65) Prior Publication Data
US 2017/0211413 A1    Jul. 27, 2017

(30) Foreign Application Priority Data
Jul. 21, 2014 (FR) ...................................... 14 57032

(51) Int. Cl.
*F01D 21/02* (2006.01)
*F02C 7/232* (2006.01)
(Continued)

(52) U.S. Cl.
CPC ............. *F01D 21/02* (2013.01); *B64D 37/32* (2013.01); *F02C 7/22* (2013.01); *F02C 7/232* (2013.01);
(Continued)

(58) Field of Classification Search
CPC .. F01D 21/02; F01D 21/14; F02C 7/22; F02C 7/232; F02C 7/26; F02C 9/26; F02C 9/28;
(Continued)

(56) References Cited

U.S. PATENT DOCUMENTS 4,032,757 A * 6/1977 Eccles .................... B64D 31/06
318/564
4,127,812 A * 11/1978 Baliguet ............... G01P 3/4805
324/174
(Continued)

FOREIGN PATENT DOCUMENTS

EP    2592253 A1    5/2013
FR    2956380 A1    8/2011

OTHER PUBLICATIONS

French Search Report with English language Translation Cover Sheet, dated Apr. 20, 2015, French Application No. 1457032.
(Continued)

*Primary Examiner* — Lorne Meade
*Assistant Examiner* — James McGlynn
(74) *Attorney, Agent, or Firm* — Womble Bond Dickinson (US) LLP

(57) ABSTRACT

The invention relates to an overspeed protection device of an aircraft engine.

6 Claims, 5 Drawing Sheets

(51) Int. Cl.
*F02C 9/28* (2006.01)
*F02C 9/46* (2006.01)
*B64D 37/32* (2006.01)
*F02C 7/22* (2006.01)
*F02C 7/26* (2006.01)
*F02C 9/26* (2006.01)
*F01D 21/14* (2006.01)

(52) U.S. Cl.
CPC ............... *F02C 9/28* (2013.01); *F02C 9/46* (2013.01); *F01D 21/14* (2013.01); *F02C 7/26* (2013.01); *F02C 9/26* (2013.01); *F05D 2270/021* (2013.01); *F05D 2270/022* (2013.01); *F05D 2270/09* (2013.01); *F05D 2270/091* (2013.01); *F05D 2270/092* (2013.01); *F05D 2270/095* (2013.01); *F05D 2270/304* (2013.01)

(58) Field of Classification Search
CPC ............... F02C 9/46; F05D 2270/021; F05D 2270/022; F05D 2270/09; F05D 2270/091; F05D 2270/092; F05D 2270/095; F05D 2270/304
See application file for complete search history.

(56) References Cited

U.S. PATENT DOCUMENTS

| | | | | |
|---|---|---|---|---|
| 4,397,148 A | * | 8/1983 | Stockton | F02C 9/46 60/223 |
| 4,474,013 A | * | 10/1984 | Chamberlain | F01D 21/02 417/17 |
| 4,712,372 A | | 12/1987 | Dickey et al. | |
| 4,716,531 A | * | 12/1987 | Saunders | G05B 9/03 60/39.091 |
| 6,321,525 B1 | * | 11/2001 | Rogers | F01D 17/06 60/39.281 |
| 7,043,896 B2 | * | 5/2006 | Matthews | F01D 21/16 60/39.091 |
| 7,840,336 B2 | * | 11/2010 | Muramatsu | F02C 7/22 123/319 |
| 9,790,807 B2 | * | 10/2017 | Cointe | F02C 9/28 |

OTHER PUBLICATIONS

International Search Report with English language Translation, dated Nov. 17, 2015, PCT Application No. PCT/FR2015/052006.
Written Opinion of the International Search Authority with English language Translation, dated Nov. 17, 2015, PCT Application No. PCT/FR2015/052006.

* cited by examiner

OVERSPEED PROTECTION DEVICE OF AN AIRCRAFT ENGINE

GENERAL TECHNICAL FIELD

The invention relates to powering aircraft engines and relates more particularly to their overspeed protection.

PRIOR ART

In an aircraft engine, excessive rotation speed of a shaft can have serious consequences, specifically and especially causing rotor discs mounted on the shaft to break. Also, such an engine is usually equipped with an overspeed protection device which receives information representative of the rotation speed of an engine shaft and controls cutting, a regulation or else a limitation of engine fuel supply when, for example, this rotation speed exceeds a predetermined threshold or when acceleration, a function of this speed, exceeds a threshold.

The overspeed safety function can be ensured by an electronic overspeed protection unit which controls a servo-valve or any other element configured to cut/regulate/limit the fuel supply of the engine or prevent the engine from entering overspeed.

This electronic unit is usually segregated from the engine control unit (ECU) and is supplied by the onboard network of the aircraft.

A problem with this type of solution is that the overspeed safety function is supplied by the same onboard network as the regulation function, therefore involving a mode common to the ECU implying that a breakdown of one can cause a breakdown of the other.

PRESENTATION OF THE INVENTION

An aim of the invention is to propose a solution which offers a good compromise of independence between the overspeed safety function and the engine control unit, without any need for complexification of supply.

For this purpose, according to a first aspect the invention proposes an overspeed protection device of an aircraft engine comprising a fuel supply system of said rotating machine, the protection device comprising

- a voltage source configured to deliver voltage according to negative or positive polarization;
- a logic control device connected in series to the voltage source, said logic control device being configured to open or close the supply system as a function of the polarization of the delivered voltage;
- a first electronic unit connected in series to the voltage source and the logic control device and which comprises
  - a first speed sensor delivering a first discrete electric control signal as a function of the speed of the engine;
  - a normally closed first switch controlled by said first discrete electric control signal;
- a second electronic unit connected in series to the voltage source and the logic control device and which comprises
  - a second speed sensor delivering a second discrete electric control signal as a function of the speed of the engine;
  - a normally closed second switch controlled by said second discrete electric control signal;

the normally closed first switch and the normally closed second switch having a 'closed' state letting current pass through and an 'open' state letting no current pass through;

the logic control device being arranged between both the first electronic unit and the second electronic unit;

the normally closed first and second switches being sensitive respectively to the first and second discrete electric control signals only if the voltage has predetermined polarization, for this predetermined polarization, the first and second switches letting the first and second electronic units isolate or connect the logic control device of the voltage source as a function of said discrete electric control signals.

The invention is advantageously completed by the following optional characteristics, taken singly or in any association of their technically possible combination:

the first and second speed sensors are configured to measure a speed of the engine and deliver discrete electric control signals having a high state for a speed of the engine Vengine such as Vthreshold1≤Vengine<Vthreshold2, with Vthreshold1 a first threshold and Vthreshold2 a second threshold characteristic of overspeed of the aircraft engine; a low state for a speed of the engine such as 0≤Vengine<Vthreshold1 and such as Vengine≥Vthreshold2, or else when the engine has a breakdown;

the first and second electronic units isolate the logic control device from the voltage source as soon as the first and second switches move from an 'open' state to a 'closed' state while the logic control device was open, the change of state of said first and second switches causing closing of the servo-valve.

the first and second speed sensors are configured to provide electric energy from rotation of the engine so as to self-feed said protection device.

the first and second speed sensors are of inductive type, for example with a phonic wheel, of alternator winding type or else an active electric sensor for measuring speed.

the device comprises a polarizer mounted in parallel with the voltage source, said polarizer being configured to polarize voltage coming from the voltage source.

the first and second switches are constituted by a transistor preferably of Darlington or bipolar type.

There are many advantages to the invention.

the simplex architecture shared in two independent functions over two independent housings;

There is total segregation between the overspeed safety function and the engine control unit;

Different supply sources coming from the aircraft or the control system between the overspeed safety function and the engine control unit can be used;

The supply independence dispenses with the fire resistance requirement on the supply function of the control part;

Breakdown detection is improved since the operating capacity of the device is linked to proper functioning of the sensors.

The architecture of the device maintains a simplex actuator to prevent the start of overspeed and ensure operating safety requirements, the capacity to actuate the device being tested before each start, with for consequence in case of breakdown the non-start.

The invention also relates to a fuel supply system of an aircraft engine comprising an overspeed protection device according to the first aspect.

The invention further relates to an aircraft engine comprising a supply device according to the first aspect.

PRESENTATION OF THE FIGURES

Other features, aims and advantages of the invention will emerge from the following description which is purely illustrative and non-limiting and which must be considered with respect to the appended drawings, wherein:

FIG. 1 schematically illustrates a protection device according to the invention;

In all figures similar elements bear identical references.

DETAILED DESCRIPTION OF THE INVENTION

Figure 1:
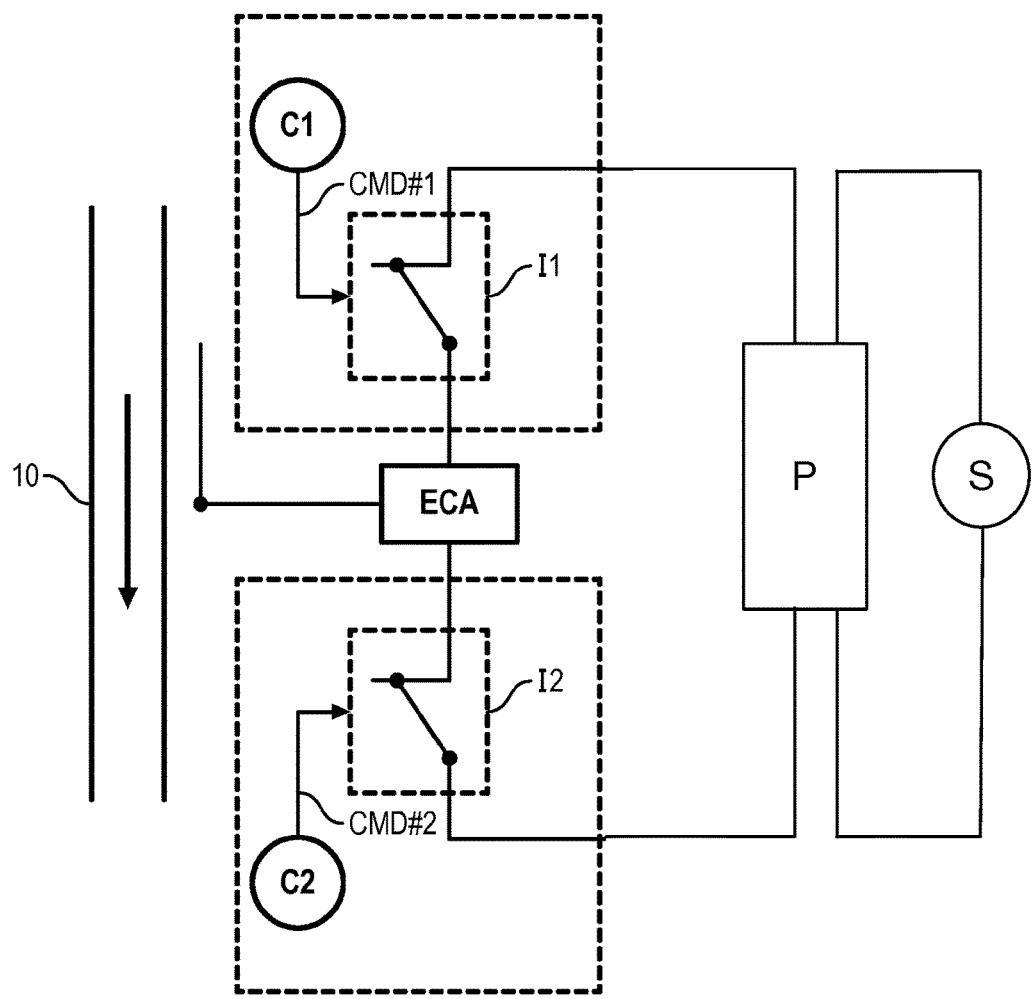

FIG. 1 illustrates an overspeed protection device of an aircraft engine according to an embodiment of the invention.

The engine (not shown) of the aircraft comprises for example a fuel supply line 10 which can be closed or limited by the protection device. Of course, the protection device applies to any rotating machine comprising a fuel supply device.

Of course the invention described in relation to this embodiment can apply to any means for preventing the engine from starting overspeed (stopping, slowdown, etc.).

The protection device comprises a voltage source S configured to deliver a voltage V according to negative or positive polarization. Therefore the voltage source S is configured to deliver amplitude voltage having for absolute value |V| according to negative or positive polarization. The voltage source therefore delivers supply voltage equal to ±V as a function of the applied polarization.

The protection device comprises a polarizer P that is connected in series to the voltage source S. The polarizer P is controlled by a control signal CMD#P originating from an order sent from the aircraft, or by an order sent by a control computer (not shown), on the basis of specific algorithms ensuring toggling of the polarization (not detailed here).

So that the fuel supply line 10 can be opened or closed, by way of non-limiting example the protection device comprises a logic control device such as a servo-valve ECA connected in series to the voltage source S. The servo-valve ECA is controlled as a function of the polarization of the voltage delivered by the voltage source S.

As is known per se, this servo-valve ECA is bistable and therefore comprises two stable states. In fact, it is considered that the servo-valve moves from an 'open' state (supply line 10 open) to a 'closed' state (supply line 10 closed) as soon as the polarization of the voltage changes to supply the servo-valve ECA according to positive or negative current.

The protection device comprises a first electronic unit ECU#1 connected in series to the voltage source S and the servo-valve ECA, the first electronic unit ECU#1 being downstream of the servo-valve, in the figure.

The first electronic unit ECU#1 comprises a first speed sensor C1 delivering a first discrete electric control signal CMD#1 as a function of the speed of the engine and a normally closed first switch I1 controlled by the first discrete electric control signal CMD#1.

It is specified here that the term speed sensor means an assembly for determining from physical information such as speed a control signal by means of physical information/electric signal conversion stage.

Also, the protection device comprises a second electronic unit ECU#2 connected in series to the voltage source S and the servo-valve ECA, the second electronic unit ECU#2 being upstream of the servo-valve ECA, in the figure.

As will be evident, the servo-valve ECA is arranged both part between the first electronic unit ECU#1 and also the second electronic unit ECU#2.

The second electronic unit ECU#2 comprises a second speed sensor C2 delivering a second discrete electric control signal CMD#2 as a function of the speed of the engine and a normally closed second switch I2 controlled by the second discrete electric control signal CMD#2.

It is considered that a normally closed switch has a 'closed' state letting current pass through and an 'open' state letting no current pass through.

The first C1 and second C2 speed sensors are configured to measure a speed of the engine and deliver discrete electric control signals presenting:

a high state ('1') for a speed of the engine Vengine such as Vthreshold1≤Vengine<Vthreshold2, with Vthreshold1 a first threshold and Vthreshold2 a second threshold characteristic of overspeed;

a low state ('0') for a speed of the engine such as 0≤Vengine<Vthreshold1 and such as Vengine≥Vthreshold2, or else when the engine has a breakdown.

The second threshold is of course higher than the first threshold.

So, for an engine having reached a speed higher than the first threshold (Vthreshold1) the high state '1' corresponds to an absence of breakdown or an absence of overspeed and the low state '0' corresponds to overspeed or breakdown. A typical first threshold Vthreshold1 is for example a speed of the aircraft engine equal to 30% of the cruising speed preferred for the aircraft engine.

However, it is considered that the engine is in overspeed as soon as the speed is greater than or equal to the second threshold typically (Vthreshold2) comprised between 110% and 130%, typically 120% of the cruising speed of the aircraft engine.

Also, the first C1 and second C2 speed sensors measure speed at different points so as to create independence of measurements and having no common mode apart from the rotation of the engine.

This ensures adequate fire resistance and avoids effects of common mode, also routing precautions are carried out to ensure topological segregation for measurements.

These first C1 and second C2 speed sensors are configured to provide from the rotation of the engine electric energy for self-feeding the protection device.

The first and second sensors are of inductive type or, more generally, of the type capable of providing an indication of speed and power. This sensor is used as a source of power and also source of measuring. A type of sensor is for example of a phonic wheel or alternator winding type or else an active electric sensor of angular position "Rotary Variable Differential Transformer", (RVDT).

In the protection device, the servo-valve ECA is framed by respectively the first electronic unit ECU#1 and the second electronic unit ECU#2 which isolate the servo-valve ECA from the voltage source S under certain conditions.

In fact, the first I1 and second I2 switches of each of the first ECU#1 and second ECU#2 electronic units are sensitive, for single polarization of the voltage, to the first CMD#1 and second CMD#2 discrete electric control signals.

To modify the polarization of the voltage, the protection device comprises a polarizer P which is controlled by a control signal CMD#P which is a function of a state of the aircraft engine: 'start', 'slowed' (i.e., having started).

It is considered that the first I1 and second I2 switches are sensitive to the first CMD#1 and second CMD#2 discrete electric control signals when the voltage source S delivers voltage at positive polarization i.e., equal to +V.

It is considered also that when the polarization is positive:
The first switch I1 is closed for a first discrete electric control signal CMD#1='0' (low state);
The first switch I1 is open for a first discrete electric control signal CMD#1='1' (high state);
The second switch I2 is closed for a second discrete electric control signal CMD#2='0' (low state);
The second switch I2 is open for a second discrete electric control signal CMD#2='1' (high state).

For this positive polarization, the first ECU#1 and second ECU#2 electronic units close the servo-valve ECA of the voltage source S as soon as the first I1 and second I2 switches move from an 'open' state (CMD#1='0', CMD#2='0') to a 'closed' state (CMD#1='1', CMD#2='1') and that the servo-valve ECA was open, the change of state of the first I1 and second I2 switches thus causing closing of the servo-valve (ECA).

In this way, it is ensured that the two electric control signals are both in the high state for closing the fuel line 10, avoiding untimely closing of the latter. In fact, when one or the other of the first or second switches is 'open' while the other is 'closed', the servo-valve ECA cannot be supplied by the voltage source S. This is all the more advantageous since the first ECU#1 and second ECU#2 electronic units are independent because the first C1 and second C2 sensors measure the speed of the aircraft engine independently.

Figure 2:
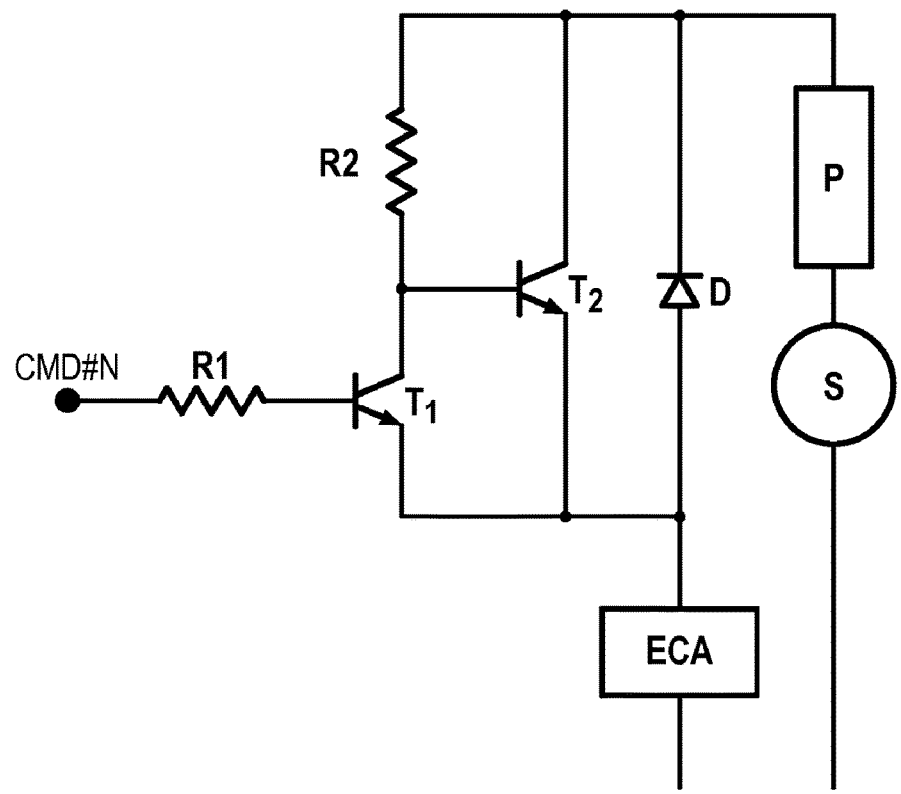
FIG. 2 illustrates an embodiment of a switch of a protection device according to the invention.

FIG. 2 illustrates a possible electronic circuit of an electronic unit (the first ECU#1 or the second ECU#2) of the protection device described hereinabove.

The normally closed switch (the first I1 or the second I2) comprises a first transistor T1 NPN controlled by the discrete electric control signal CMD#N (N=1 or 2) and a second transistor T2 NPN, the collector of the first transistor T1 is connected to the base of the second transistor T2.

The circuit also comprises a diode D connected between the servo-valve ECA and the voltage source 11, the diode D mounted inversely to the transistor T2.

Also, the circuit comprises a first resistance R1 connected to the base of the first transistor T1, the first resistance R1 applying the electric control signal CMD#N to the base of the first transistor T1.

Also, a second resistance R2 is connected between the base of the second transistor T2 and the collector of the second transistor T2.

By way of advantage, the second transistor T2 is of Darlington type, which has the advantage of polarizing the transistor T2 with very weak current and substantially limiting leakage currents when the transistor T2 is open.

Preferred operation of the protection device described hereinabove is explained below.

Figure 3:
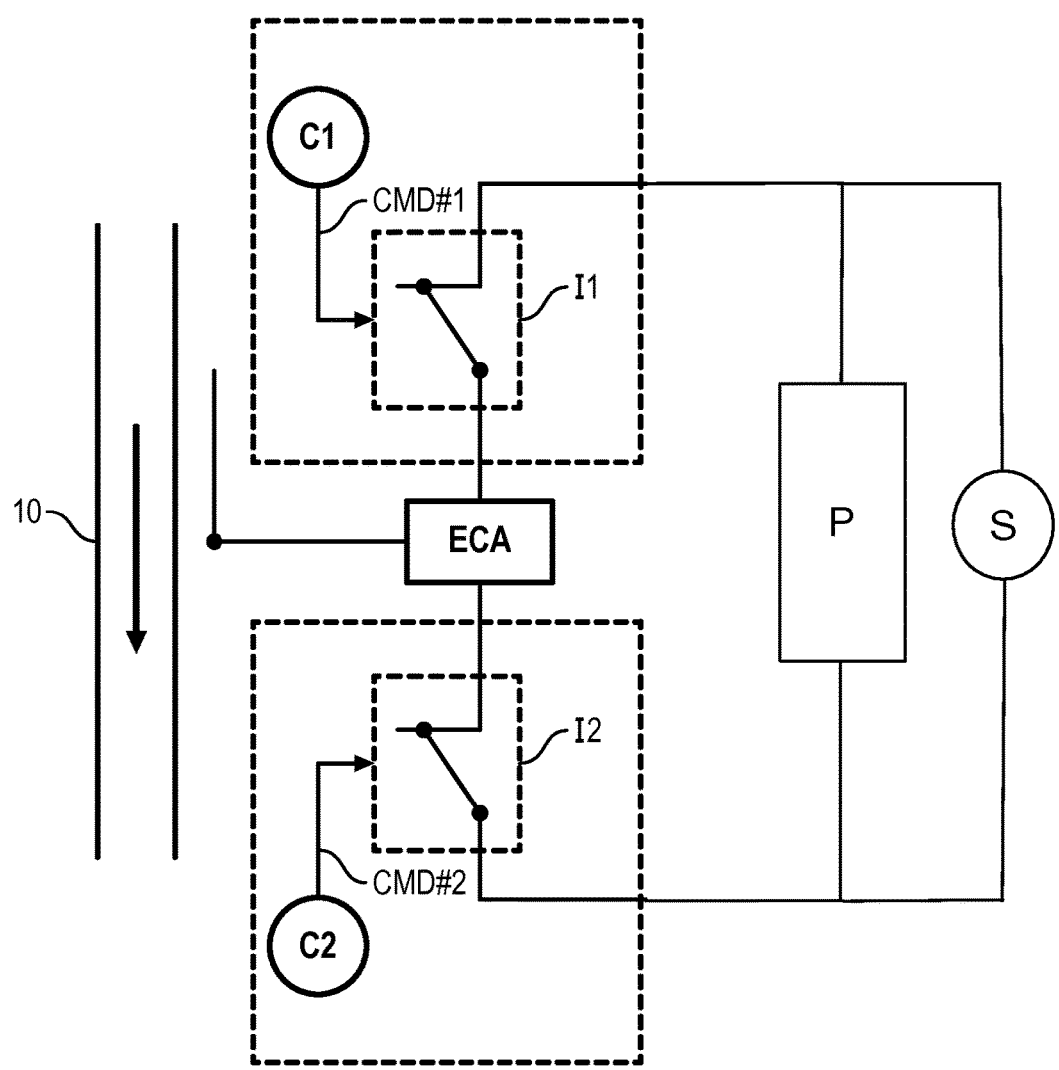
FIGS. 3 to 5 illustrate operation of a protection device according to the invention.

In relation to FIG. 3, the state of the aircraft engine is 'start'. The polarizer P receives a command CMD#P controlling the voltage source so that it delivers voltage having negative polarization equal to V. As will be evident the engine therefore must be supplied with fuel and the normally closed switches I1, I2 not be sensitive to the electric control signals CMD#1, CMD#2 so as to prevent untimely closing of the fuel supply line 10 of the engine which is open in this case. During start, the first and second sensors C1, C2 deliver respectively first and second discrete electric control signals CMD#1, CMD#2 in the low state (CMD#1='0', CMD#2='0'). The engine can start. It is noted that in 'start' mode, only the state of the diodes counts such that the control device is insensitive to the electric control signals CMD#1, CMD#2.

The aircraft engine then moves to the 'started' state. In relation to the 'start' state the first C1 and second C2 sensors now deliver first and second discrete electric control signals CMD#1, CMD#2 in the high state (CMD#1='1', CMD#2='1'), the speed of the engine being at 30% of its cruising speed. Of course, the servo-valve ECA still keeps the fuel line 10 open to enable fuel supply to the engine. It is from this state that the overspeed protection must be active.

Figure 4:
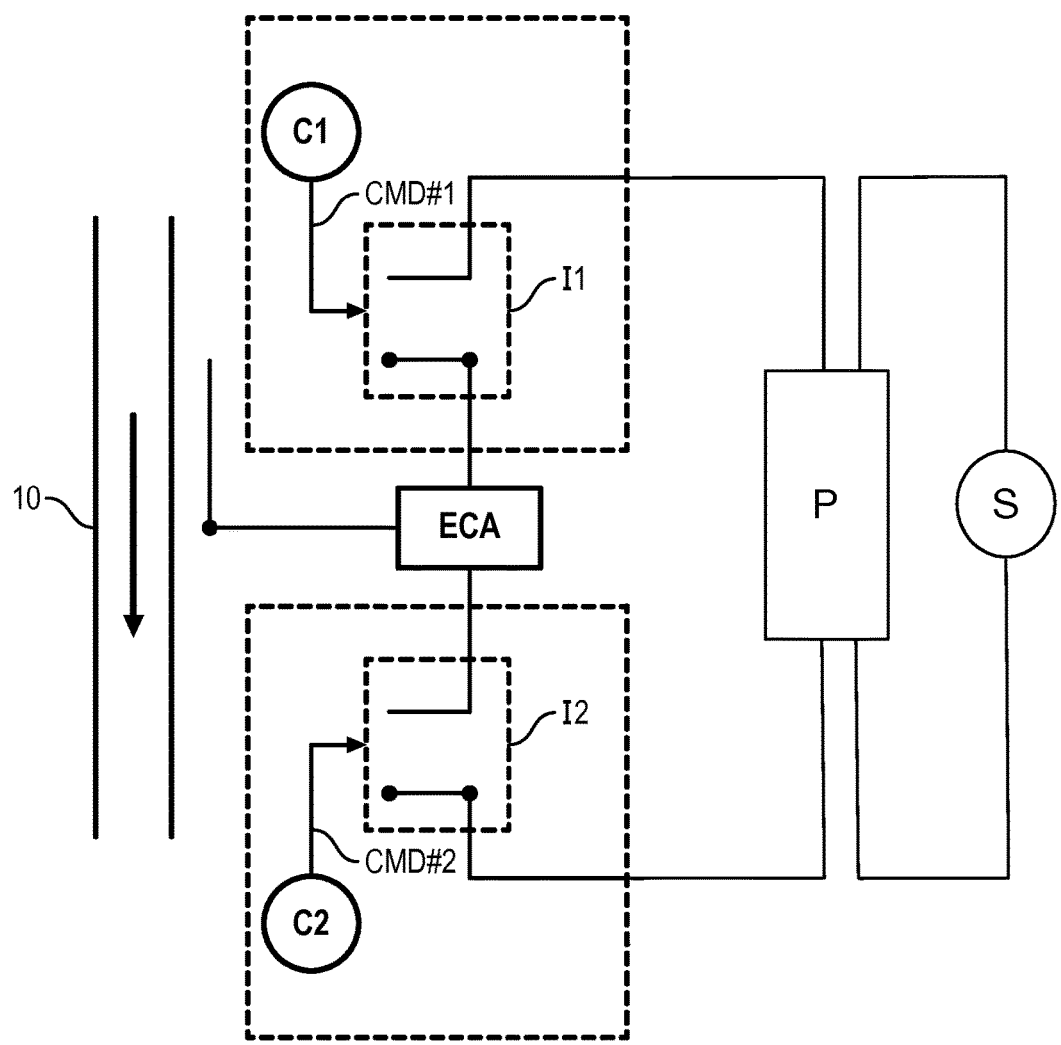

In relation to FIG. 4, the state of the aircraft engine is 'slowed', i.e., it has been able to start. In this case the overspeed protection must be active. The first and second discrete electric control signals CMD#1, CMD#2 are in the high state (CMD#1='1', CMD#2='1'), and the polarizer P receives a command CMD#P controlling the voltage source S so that it delivers voltage having positive polarization equal to +V. In this case, the first and second switches I1, I2 are sensitive respectively to the electric control signals CMD#1, CMD#2 and move from the 'closed' state to 'open'. In this way the servo-valve is no longer being powered such that the change in polarization of the delivered voltage by the voltage source S has no effect on the latter. The aircraft engine is therefore still being supplied with fuel, the servo-valve ECA now open. Also, the first C1 and second C2 sensors are still delivering first and second discrete electric control signals CMD#1, CMD#2 in the high state (CMD#1='1', CMD#2='1'), the speed of the engine still being greater than 30% of the cruising speed of the engine.

Figure 5:
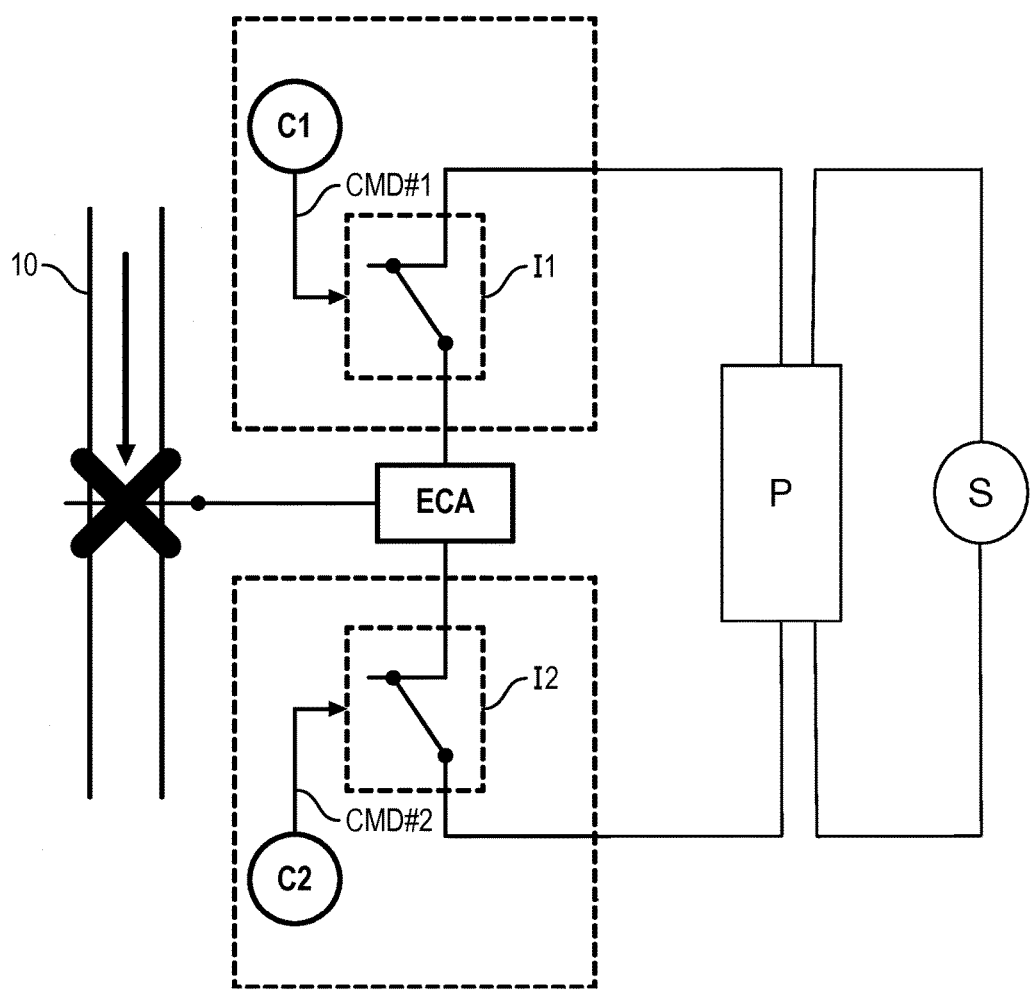

In relation to FIG. 5, the state of the aircraft engine is 'fault'. A fault is for example a loss of the first and/or second discrete electric control signal CMD#1, CMD#2) or detection of overspeed of the engine. The loss can be due to failure of the engine or else to failure of the first and/or of the second speed sensor(s) C1, C2. Since the protection function is active (the voltage source S delivering voltage having positive polarization and equal to +V), the first and second switches I1, I2 are sensitive respectively to the first and second discrete electric control signals CMD#1, CMD#2. But, given that the first ECU#1 and second ECU#2 electronic unit are on both sides of the servo-valve ECA, to be connected to the voltage source S the two switches I1, I2 have to be in the closed state. In this way it can change state (it was open previously) since the polarization will have changed. In this way, there is closing of the fuel line 10 only when the two electric control signals are in the low state (CMD#1='0', CMD#2='0'). As explained previously, because the states of the electric control signals are independent, the closing of the fuel line 10 is not untimely.

The invention is not limited to the protection device described hereinabove and also relates to a fuel supply system of an aircraft engine comprising a overspeed protection device described hereinabove as well as an aircraft engine comprising such a supply device.

The invention claimed is:
1. An overspeed protection device of an aircraft engine comprising a fuel supply system of said aircraft engine, the overspeed protection device comprising a voltage source delivering voltage according to negative or positive polarization via a polarizer mounted in parallel with said voltage source;

a logic control device connected in series to the voltage source, said logic control device opening or closing the fuel supply system as a function of the polarization of the delivered voltage;

a first electronic unit connected in series to the voltage source and the logic control device and which comprises
   a first speed sensor delivering a first discrete electric control signal as a function of a speed of the aircraft engine;
   a normally closed first switch controlled by said first discrete electric control signal;

a second electronic unit connected in series to the voltage source and the logic control device and which comprises
   a second speed sensor delivering a second discrete electric control signal as a function of the speed of the aircraft engine;
   a normally closed second switch controlled by said second discrete electric control signal;

the normally closed first switch and the normally closed second switch having a 'closed' state letting current pass through and an 'open' state letting no current pass through;

the logic control device being arranged between both the first electronic unit and the second electronic unit;

the normally closed first switch and the normally closed second switch being sensitive respectively to the first discrete electric control signal and the second discrete electric control signal only if the voltage has a same predetermined polarization, for this same predetermined polarization, the normally closed first switch and the second normally closed switch letting the first electronic unit and the second electronic unit isolate or connect the logic control device to the voltage source as a function of said discrete electric control signals, wherein the logic control device can only be supplied by the voltage source when both the normally closed first switch and the normally closed second switch are closed.

2. The overspeed protection device according to claim 1, wherein the first speed sensor and the second speed sensor are configured to measure a speed of the aircraft engine and deliver discrete electric control signals having
   a high state ('1') for the speed of the aircraft engine Vengine as Vthreshold1≤Vengine<Vthreshold2, with Vthreshold1 a first threshold and Vthreshold2 a second threshold characteristic of overspeed;
   a low state ('0') for the speed of the aircraft engine as 0≤Vengine<Vthreshold1 and such as Vengine≥Vthreshold2, or else when the aircraft engine has a breakdown.

3. The overspeed protection device according to claim 1, wherein the first electronic unit and the second electronic units isolate the logic control device from the voltage source as soon as the normally closed first switch and the normally closed second switch move from an 'open' state to a 'closed' state while the logic control device was open, the change of state of said normally closed first switch and normally closed second switch causing closing of a servo-valve.

4. The overspeed protection device according to claim 1, wherein the first speed sensor and the second speed sensor are configured to provide electric energy from rotation of the aircraft engine so as to self-feed said overspeed protection device.

5. The overspeed protection device according to claim 4, wherein the first speed sensor and the second speed sensor are of inductive type, including a phonic wheel, of alternator winding type or else an active electric sensor for measuring speed.

6. The overspeed protection device according to claim 1, wherein the normally closed first switch and the normally closed second switch are constituted by a transistor preferably of Darlington or bipolar type.

* * * * *